United States Patent [19]

Schneider

[11] Patent Number: 5,720,169
[45] Date of Patent: Feb. 24, 1998

[54] THERMOCHEMICAL/MECHANICAL ACTUATOR

[76] Inventor: Edward T. Schneider, 8729 Hilltop Dr., Mentor, Ohio 44060

[21] Appl. No.: 447,914

[22] Filed: May 23, 1995

[51] Int. Cl.⁶ .................................................. F03C 5/00
[52] U.S. Cl. ...................................... 60/530; 60/528
[58] Field of Search .............................. 60/527, 528, 530

[56] References Cited

U.S. PATENT DOCUMENTS

| | | | |
|---|---|---|---|
| 2,810,290 | 10/1957 | Scherer | 60/527 |
| 2,938,384 | 5/1960 | Soreng et al. | 73/358 |
| 2,989,281 | 6/1961 | Fritts | 251/11 |
| 3,376,631 | 4/1968 | Sherwood et al. | 60/527 |
| 3,404,530 | 10/1968 | Churchill et al. | 60/23 |
| 3,430,440 | 3/1969 | Pouliot | 60/23 |
| 4,081,963 | 4/1978 | Stove | 60/528 |
| 4,222,239 | 9/1980 | Negishi | 60/527 |
| 4,235,075 | 11/1980 | Erb | 60/527 |
| 4,258,899 | 3/1981 | Huelle et al. | 251/11 |
| 4,553,393 | 11/1985 | Ruoff | 60/528 |
| 4,685,651 | 8/1987 | Nouvelle et al. | 251/11 |
| 4,759,189 | 7/1988 | Stropkay et al. | 60/531 |
| 5,025,627 | 6/1991 | Schneider | 60/527 |
| 5,177,969 | 1/1993 | Schneider | 60/527 |
| 5,222,362 | 6/1993 | Maus et al. | 60/527 |
| 5,263,644 | 11/1993 | Chen et al. | 60/527 |
| 5,288,214 | 2/1994 | Fukuda et al. | 417/395 |
| 5,419,133 | 5/1995 | Schneider | 60/527 |

FOREIGN PATENT DOCUMENTS

| | | |
|---|---|---|
| 701621 | 1/1965 | Canada . |
| 365011 A2 | 4/1990 | European Pat. Off. . |
| 1571082 | 6/1969 | France . |
| 2384944 | 3/1977 | France . |
| 2590326 | 11/1985 | France . |
| 2627816 | 2/1988 | France . |
| WO94/16368 | 7/1994 | WIPO . |

OTHER PUBLICATIONS

Technical Specification No. Cod.82.0331.00 (Italy) May 1991.
"PTC Thermistors, Introduction of PTC Overload Protection", Philips Components, Mar. 1995 pp. 225–228.
"High–Output Paraffin Linear Motors: Utilization in Adaptive Systems", Tibbitts, SPIE V. 1543 Active & Adaptive Optical Components (1991) pp.388–398.
"Electrothermal Microactuators Based On Dielectric Loss Heating", Rashidian, et al., Proc. IEEE Micro Electro Mech Sys–An Invest of Micro Structures, Sensors, Actuators, Mach & Sys; Ft. Lauderdale, FL Feb 7–10, 1993 pp. 24–29.

*Primary Examiner*—Noah P. Kamen
*Attorney, Agent, or Firm*—Fay, Sharpe, Beall, Fagan, Minnich & McKee

[57] ABSTRACT

A housing (10, 46, 64, 90, 100) has an internal opening in which a thin recess is defined for receiving a heat expansible polymer (30) and a heating element (24). In some embodiments, an insert (14, 98, 102) is inserted into the housing bore such that the thin recess is defined therebetween. In other embodiments, the recess is defined between the housing and a force receiving surface of a piston (40, 60). When the heating element is heated, the polymer expands, forcing the piston to extend. When heating is stopped, the polymer cools allowing the piston to retract. In the embodiment of FIG. 4, the retraction is accelerated by a second polymer and heating element region (54). In other embodiments, a transmission arrangement (72, 74, 78; 124, 126, 128) is provided for converting the relatively high force, low travel of the heated polymer to a higher travel lower force output. In one embodiment, the heating element is resistance heating wire (32) which is surrounded by a covering (36) of electrically insulating material which is porous to the melted polymer.

42 Claims, 5 Drawing Sheets

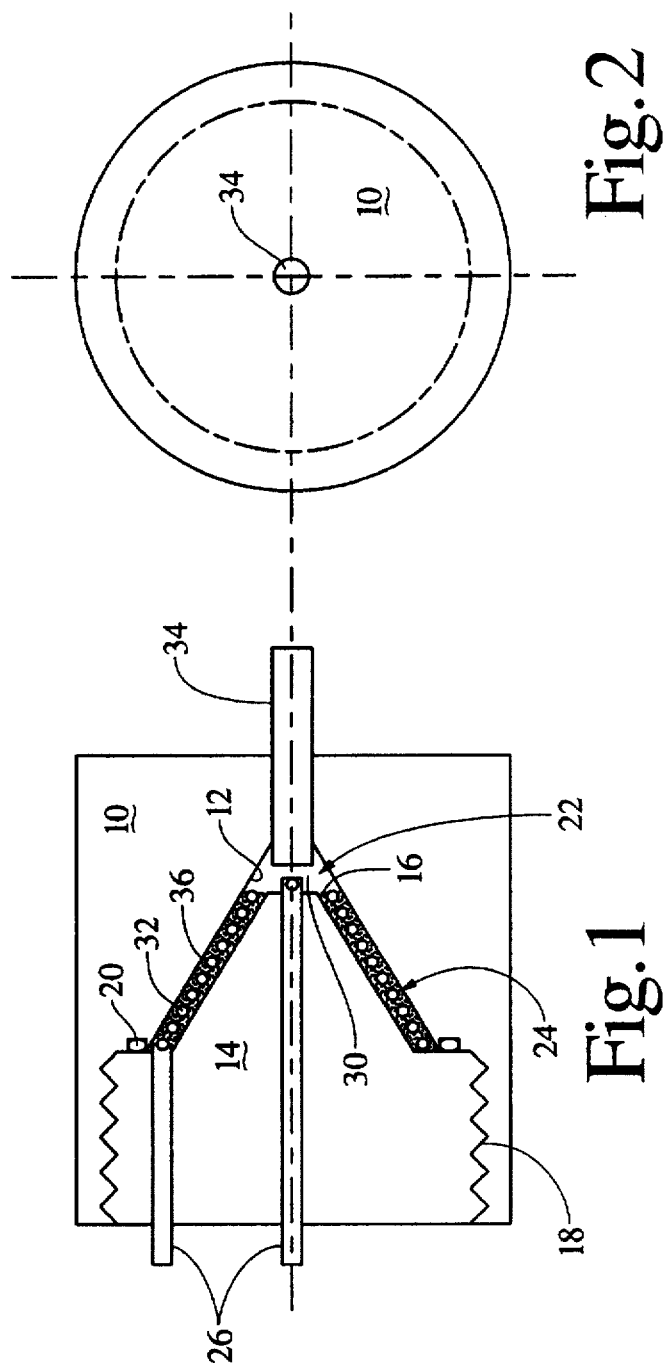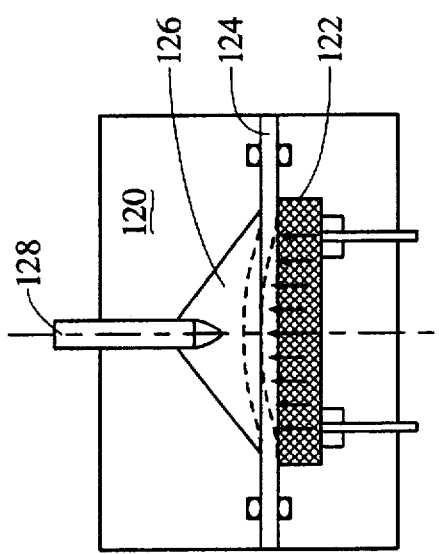

THERMOCHEMICAL/MECHANICAL ACTUATOR

BACKGROUND OF THE INVENTION

The present invention relates to mechanical power supplies and actuators. It finds particular application in conjunction with high force, low travel extensible actuators and will be described with particular reference thereto. However, it is to be appreciated that the invention will also find application in conjunction with other high pressure fluid systems, as well as other mechanical power supplies, pumps, motors, pressure cylinders, valve controllers, and the like.

One way to effect heat transfer is by physically moving mass, e.g., a liquid to a heat source. Heated liquid/vapor is caused to flow against resistance to a cooling source. Steam and other types of external combustion engines typify this technique. In another technique, heat energy locked in molecular bonding is pumped into a combustion chamber. The mix is ignited and the combustion vapor is permitted to exit the chamber against resistance, physically removing the heat and clearing the chamber for the next cycle. The internal combustion engine typifies this mode. These two modes utilize the well-known capabilities of mass transfer as an efficient method of transporting heat and minimizing the need for thermal conduction for moving heat.

These liquid/vapor phase techniques have several drawbacks. First, the vapor phase is compressed at very high pressures. An unanticipated release of these pressures creates shock waves associated with a blast, hurling debris in a dangerous manner. The material is transported and expended, requiring complex controls and valving, as well as a continuous supply of liquid to replace the liquid lost or consumed.

Rather than transporting the material which is acted upon by the heat to expand and contract, the heat itself may be moved. More specifically, as shown in the parent U.S. Pat. Nos. 5,177,969 and 5,025,627, heat can be conducted into and out of a sealed chamber which expands during the heating cycle and contracts during the cooling cycle. The sealed chamber technique has many advantages including its mechanical simplicity, proportional control, high stiffness actuation, ready adaption to a variety of heat sources, high power density, and silent operation. Moreover, because liquids compress only a small amount, as compared to vapors, they tend to be much safer than a liquid/vapor system. Unfortunately, the transfer of heat into and out of the medium normally relies on thermal conductivity. Mediums which exhibit good expansion/contraction ratios upon melting tend to have relatively poor thermal conductivities. Thus, a solid/liquid sealed chamber phase change actuator tends to have a very slow cycle time.

The present invention contemplates a new and improved sealed chamber actuator which overcomes the above-referenced speed problem and others.

SUMMARY OF THE INVENTION

In accordance with one aspect of the present invention, a thermochemical actuator is provided. A body portion defines a piston receiving bore. A piston which is slidably received in the bore has a surface for selectively receiving motive force for moving the piston. The body portion defines a shallow recess opposite the force receiving surface of the piston. The shallow recess has a back wall which is generally parallel to the piston force receiving surface. The housing and piston interact such that the recess defines a sealed chamber. A polymeric material which expands on heating and a heater are disposed in the sealed chamber such that selective actuation of the heater causes the polymer to expand, exerting pressure on the piston pressure receiving surface causing the piston to move. Upon cooling of the polymer, the polymer retracts allowing the piston to retract.

In accordance with a more limited aspect of the present invention, the piston force receiving surface is conical.

In accordance with another more limited aspect of the present invention, the heater includes resistance heating wire wound around the sealed chamber. More specifically, the wire is covered with an electrically insulating covering that is porous to the liquid polymer material, such as a woven insulation.

In accordance with another more limited aspect of the present invention, a transmission is provided which reduces exerted force and increases travel of the piston or other extended mechanical element.

In accordance with another more limited aspect of the present invention, the piston defines two force receiving surfaces generally oppositely disposed. A second polymer and heater selectively exert counter-acting force on the piston second force receiving surface. In this manner, a double-acting actuator is provided.

In accordance with another aspect of the present invention, a thermochemical actuator is provided that has a body portion defining an enlarged opening. An insert is disposed within the enlarged opening such that a thin chamber is defined therebetween. A heat expandable polymer and heater fill the thin region. A member is mounted in communication with the thin region such that expansion of the polymer urges the member to extend.

In accordance with another more limited aspect of the present invention, the insert is one of a toroid, a cylinder, and a cone.

In accordance with another more limited aspect of the present invention, a thermochemical actuator is provided. A body defines an opening. A heat expandable polymer and a heater are disposed in the opening such that as the heater heats the polymer, the polymer expands with a relatively high force and low expansion distance. A hydraulic converter converts the high force and low expansion distance to a lower force, higher travel distance of a mechanical member.

In accordance with another aspect of the present invention, a method of thermochemical actuation is provided. An electrical current is applied to a heater having a multiplicity of closely spaced thin elongated heating elements disposed in a polymer. As electrical current is applied to the resistance heater, the polymer closely adjacent to the elongated elements liquifies and expands. Pressure from the expansion of the polymer forces the liquified polymer to flow along the elongated heating elements. Pressure from the liquid polymer pressing against unmelted polymer urges the unmelted polymer against a member which is caused by the pressure to extend.

One advantage of the present invention resides in its speed of operation. The present design permits speeds which are comparable with a solenoid.

Another advantage of the present invention resides in its mechanical simplicity.

Another advantage of the actuators in accordance with the present invention resides in their high stiffness.

Other advantages include proportional control, high power densities, silent operation, safety, and flexibility of heat sources.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 1 is a cross-sectional view of an actuator in accordance with the present invention;

FIG. 2 is an end view of the actuator of FIG. 1;

FIG. 10 is a cross-sectional view of a diaphragm embodiment with a hydraulic multiplier; and, FIG. 11 illustrates an inductively controlled alternate embodiment.

DETAILED DESCRIPTION OF THE PREFERRED EMBODIMENTS

Figure 3A:
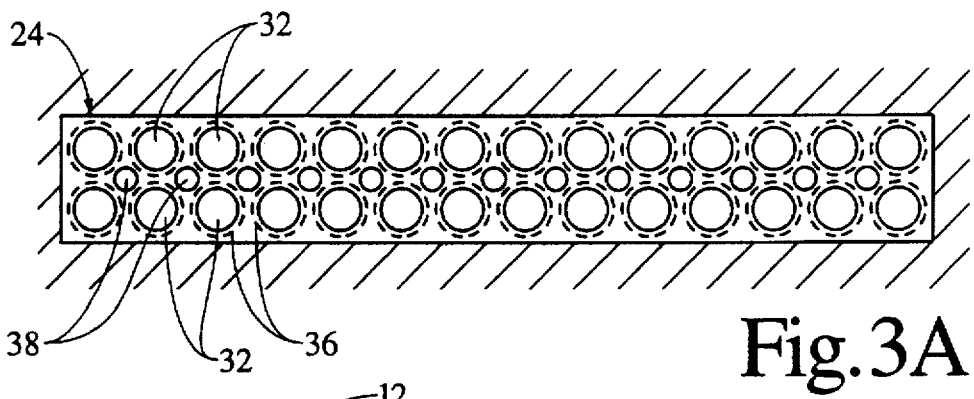
FIG. 3A is an enlarged sectional view illustrating the heater wires of FIG. 1.

With reference to FIGS. 1 and 2, a first cylindrical body portion 10 defines a generally conical surface 12. A second body member 14 having a conical surface 16 is interconnected with the first body member. In the illustrated embodiment, the first and second members are interconnected by interconnecting threads 18. However, other rigid interconnections are also contemplated including welding, staking, crimping, and the like. A metal gasket 20 is compressed adjacent the threads 18 to inhibit leakage through the threads.

A sealed chamber 22 is defined between the conical surfaces 12 and 16. A heating element 24 is wound in a conical pattern through the conical sealed chamber 22. Electrical feedthroughs 26 are connected with opposite ends of the heating element 24. The heating element is surrounded by a heat expandable polymer 30. In the preferred embodiment, the heating element 24 includes a length of nichrome wire 32 for electrical resistance heating. For rapid actuation, the wires are mounted within 0.3 cm apart. However, other heating systems are also contemplated, including resistance heating, tubes for circulating heating fluids, high thermal conductivity filaments for conveying heat from one or more heating elements, or the like. The sealed chamber 22 is filled with a thermally expansive material, preferably a short or medium chain polyethylene, such as paraffin. Various polymers which expand on heating, contact on cooling, and which do not irreversibly break down under the heat and temperatures developed in the actuator are contemplated. Polymers which undergo a phase change can be particularly effective for converting thermal energy into expansion force. A mechanical member, such as a pin 34, is slidably received in communication with the chamber 22. As the polymer expands, the pin extends. As the polymer contracts, the pin is retracted. Other mechanical members can also be used such as a snap dome, flexible member, direct fluid-to-fluid interface, or the like.

With reference to FIG. 3A, the heating element 24, in the preferred embodiment, includes a plurality of nichrome wires 32, each of which is encased in a porous, electrically insulative covering 36, in the preferred embodiment, a woven fiberglass sleeve. The porous insulating covering has sufficient porosity that the polymer can flow freely therethrough, yet has sufficient rigidity that adjacent nichrome wires 32 do not short together. Optionally, high thermal conductivity fibers 38, such as carbon fibers, are interspersed among the nichrome wires. When the high thermal conductivity fibers are also electrically conductive, as most high thermal conductivity fibers are, the high thermal conductivity fiber is also covered with the porous insulating covering. The high thermal conductivity fibers are connected with the heat sink, such as the body 10.

Figure 3B:
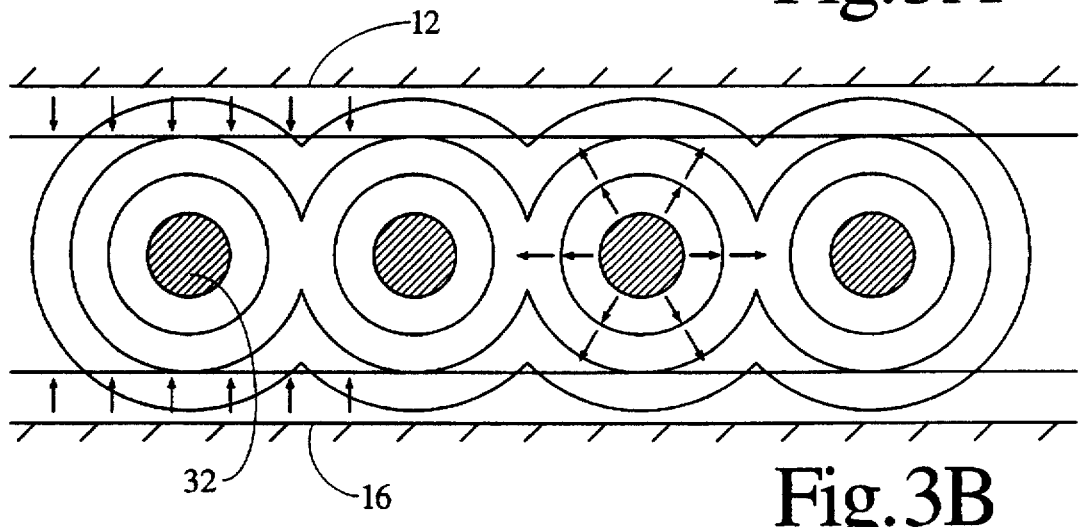
FIG. 3B illustrates expanding and contracting heat zones around heating wires in the core.

With reference to FIG. 3B, when electricity is applied through the heating wire 32, a polymer which undergoes a solid/liquid phase change melts in a tubular region along the surface of the nichrome wire. As additional electricity is applied to the wires and additional heating occurs, the cylinder of liquid polymer surrounding each wire expands. Quickly, the melt zones from adjacent fibers link up, allowing liquid to flow in many directions. Ideally, the nichrome wires are spaced closely adjacent and 0.1 cm or less from each other, such that the link-ups occur quickly. The above-discussed woven fiberglass covering enables the wires to be positioned very closely adjacent. Moreover, the expanding polymer may move through the pores in the woven fiberglass sending molten polymer jets into the surrounding polymers. However, other spacing mechanisms for holding the wires separated are also contemplated. Tabs or winding guides may be formed on one or both of surfaces 12 and 16, which constrain the wires to generally spiralling conical path illustrated in FIG. 1.

It will be appreciated that the initial thin cylindrical melt zones immediately around the heating wires form a path along which the expanding liquid polymer flows. The wires extend along a path or paths that moves closely adjacent the piston or other mechanical movement element, such that the pressure of the melting and expanding polymer is conveyed by the fluid flow to the pressure-to-mechanical converter 30. On deactuation, the residual heat in the nichrome wires maintains liquid polymer flow paths along the wires assuring return of the polymer to its preactuation position.

The body or housing 10, 14 is preferably of a strong high thermal conductivity material, such as beryllium copper. The resistance heating elements are selected to achieve proper heating under a selected electrical current level. Proper heating connotes rapid heating, without overheating the polymer to the point that it irreversibly breaks down. The sealed chambers are relatively thin to maximize the surface area of the chamber relative to the polymeric material. The body portions are electrically insulated from the resistance heating wires or elements.

The cooling path length for cooling the polymer after actuation is minimized. That is, the thickness of the polymer and the sealed chamber is minimized as the surface area of the chamber is maximized. For deactuation, a given quantity of heat (for a polymer that changes phase, the heat of fusion) must be removed. The amount of time to remove this heat constitutes the time or speed of deactuation. Preferably, deactuation is achieved in under two seconds. Two functions govern the speed of deactuation. First, a steady state heat transfer formula defines a rate Q of heat transfer along a steady state conduction path of a temperature difference $T_2-T_1$, a thermal conductivity K, an area A, and a length x, i.e.:

$$Q=(KA/x)(T_2-T_1) \qquad (1).$$

It will be noted that the heat transfer rate is inversely proportional to the length x. Hence, the length x should be sufficiently short to facilitate a given amount of heat transfer in a given time. This formula also emphasizes other elements of an advantageous design. The thermal conductivity K of the fibers should be as high as possible. This thermal conductivity can be achieved or assisted with high thermal conductivity ceramic fibers or silicon carbide fibers. Second, the conductivity cross-sectional area A of the fibers should be maximized, e.g., by increasing the density of the fiber pack. The temperature difference $T_2-T_1$ is a relatively constant boundary condition for a given polymer of melting temperature $T_2$ with a body sink temperature $T_1$.

A second factor in the cooling path is the diffusivity of the materials in the path. Diffusivity is defined as:

$$D=K/pC \qquad (2),$$

where K is the thermal conductivity, p is the density, and C is the specific heat. This measurement relates to the transient condition under which temperatures along the path are changing as conditions are developing. This initial state dominates in short time frames, such as the desired short deactuation times. The diffusivity is a ratio of the thermal conductivity of the path to the energy stored in the conduction paths, whether the conduction paths be fibers, polymers, or a combination of the two. The diffusivity is an indicator of the time required to drain the energy present through the path resistance. The polymer diffusivity and path length creates a time constant to remove the heat of fusion upon cooling, which is fixed for a given amount of polymer and its path length. The polymer path length and diffusivity can be minimized by reducing the spaces between fibers of the conductive matrix and the distance to the housing wall. The conduction matrix path or fibers represent an additional thermal mass whose energy storage should be minimized for optimal cooling rates. The thickness of the core in the cooling direction determines the amount of polymer serviced by a single fiber in the conductivity matrix. Because the fiber is of a fixed cross-sectional area and the core thickness may vary, the cooling time constant is set by the fiber packing density and the path length.

Another factor in core thickness is the viscous flow path. As the polymer melts, it must flow to the expansion surface of the actuator. In this phenomenon, the flow is cumulative from the bottom or fixed surface to the top, moving surface. The expansion of the differential element below propels the differential element above and the expansion of the element above adds to the net flow at the top of the surface.

During the expansion process, molten polymer passes through thermal conduction matrix gaps and experiences viscous drag, consuming some of the work. The viscous drag, of course, increases actuation time. Accordingly, there is a trade-off between increasing the conductive polymer matrix density to improve thermal flow efficiency and decreasing the matrix density to reduce viscous drag. Typically, initial melting occurs around the heating elements and fibers. As the melting progresses, the gaps between the fibers melt, increasing the flow paths. On deactuation, the polymer begins to solidify around the fibers. The solidification reduces gaps between the fibers and places a layer of thermal insulation between the still molten polymer and the fiber or resistance heating wire. If the fiber cools too suddenly, it can choke the gaps off and prevent the remaining polymer from returning to its rest position, creating permanent displacement. The use a tapered piston as illustrated above enables the axial piston movement to accept the radial volume expansion generated by a core of relatively thin section, minimizing losses.

Figure 3C:
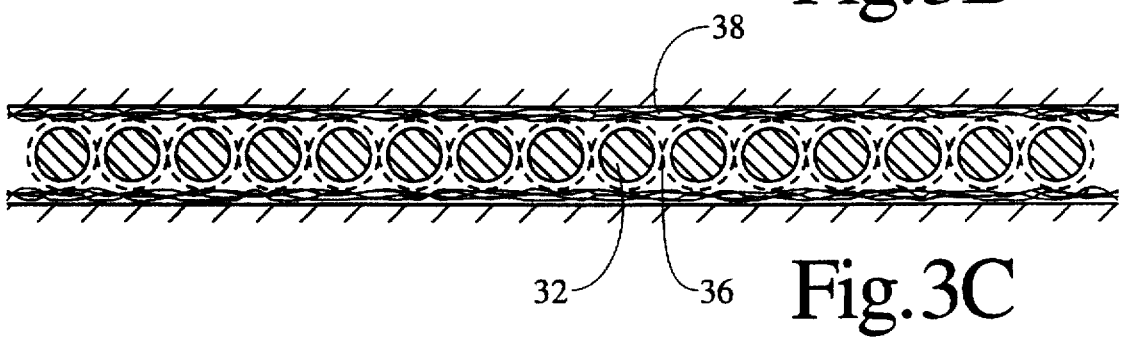
FIG. 3C illustrates an alternate core embodiment with high thermal conductivity fiber mats.

With reference to FIG. 3C, thermal communication in directions orthogonal to the wires can also be promoted by positioning mats of the high thermal conductivity fibers 38 between the porous insulating covering 36 of the heating wires and the surfaces 12 and 16 of the sealed chamber 22. The mats may be woven mats, random fiber mats, or the like. Moreover, the mats or high thermal conductivity fibers in other forms may be distributed among the heating wires in various patterns in order to distribute the heat uniformly and quickly as the polymer is melted and to assist in removing the heat quickly and uniformly as the polymer is cooled and solidifies.

Figure 3D:
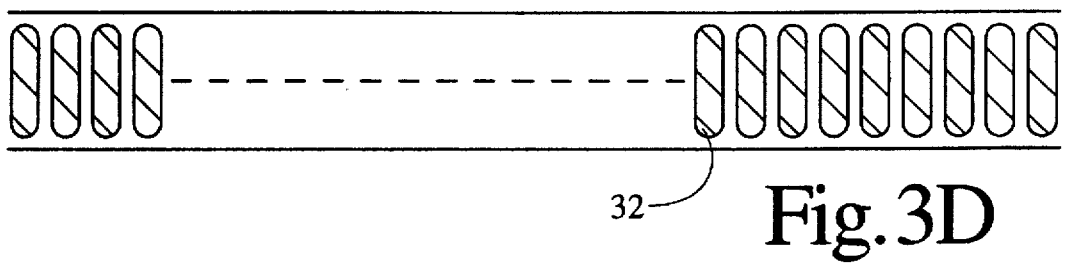
FIG. 3D illustrates another alternate core design with flat heating wires.

With reference to FIG. 3D, it is to be appreciated that heat transfer between the heater wires and the polymer is in part determined by the surface area of the heating elements. As the surface area or area of contact between the polymer and the heating elements increases, the efficiency of thermal transfer increases. Accordingly, the thermal heating elements are preferably of a shape which maximizes surface area. As a second consideration, the polymer is a relatively effective thermal insulator. Accordingly, effective heat transfer can be improved by minimizing the thickness of the polymer between adjacent heating elements. Accordingly, it is preferred that the shape of the heating elements be configured for optimal close packing. In the embodiment of FIG. 3D, the heating elements have been flattened into ribbons. Other shapes which maximize surface area and optimize close packing of the heating members are also contemplated, such as rectangular heating elements, triangular heating elements, and the like.

Figure 4:
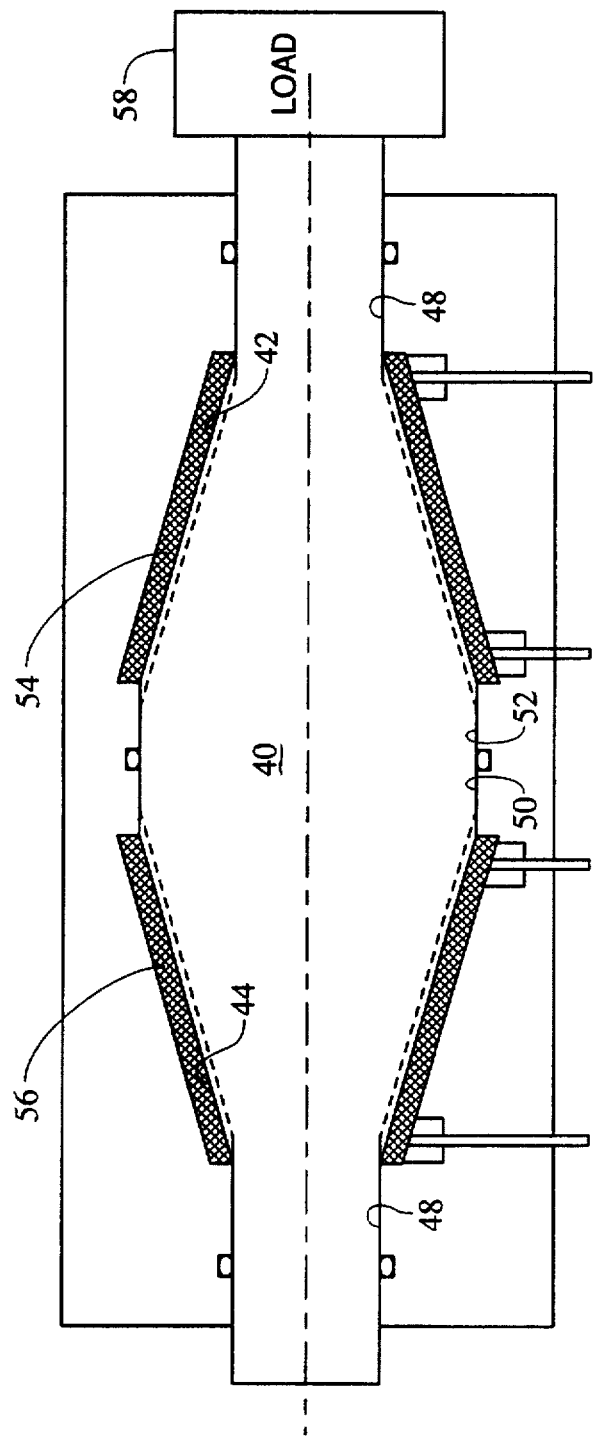
FIG. 4 is a double-acting actuator in accordance with the present invention.

With reference to FIG. 4, a double-acting actuator including a central cylinder or rod 40 having a first conical surface 42 and a second conical surface 44 symmetrically on opposite sides of a center line. A housing 46 defines end bores 48 which slidingly receive ends of the piston 40 and a central cylindrical bore 50 which slidably receives a central cylindrical portion 52 of the piston. A pair of tapered generally conical sealed chambers 54, 56 are defined adjacent conical surfaces 42, 44. Each of the chambers 54 holds heating elements and a thermally expansive polymer, and optionally thermally conductive fibers or elements as described above. The heating element in the sealed chamber 54 is actuated to shift the piston away from a load 58. After the heating element of the first chamber 54 is shut off, the heating core in the second sealed chamber 56 is actuated to shift the piston 40 to the right towards the load. By actuating the heating elements in one of the chambers while deactivating the heating element in the other, shifting of the piston full scale in the deactuation direction is accelerated. Intermediate positions of the piston between the full scale extremes can be achieved by applying balanced fractions of the energy to the heating elements in each of the sealed chambers 54, 56.

The double-acting actuator provides a much higher retraction speed. One of the limiting criteria of a single-acting actuator of the present design is that retraction is based on cooling which, as discussed above, tends to be slower than heating. The above-described units can attain an initial actuation in about 20 msec. with full travel in the range of 50–100 msec. However, retraction is commonly about 400 msec. Solidification time on cooling is a function of temperature (energy) of the melt being low enough to allow stable formation of solids. The average time period for a sufficient number of randomly moving liquid molecules to strike a solid matrix in the correct position for crystallization also controls deactuation speed. Another effect is that the solid matrix is losing atoms to the liquid at a given rate depending on the thermal vibration level of the solid. If the rate of the liquid molecules arriving in the proper orientation for solidification to occur exceeds the rate of loss of molecules to the liquid solution, net solidification is occurring. This allows several ways of influencing solidification rates. It should be noted that the polymers tend to solidify, rather than crystallize, because crystalline and non-crystalline structures tend to occur. At high deactuation rates, the time is insufficient for the liquid molecules to rattle around and find correct crystallization sites. Hence, a high proportion of glassy or amorphous solid tends to be generated with a corresponding lower density due to poor order in the structure. The solidification rates can be increased by supercooling the solid to reduce the loss rate of solid crystalline or glassy molecules to the liquid. The number of sites for crystallization can be increased to improve the statistical frequency of liquid molecules hitting a solidification site properly oriented. This can be achieved by the addition of nucleating agents, which mimic solid polymer structure but never melt under the cycle temperatures, leaving seeds within the liquid melt. Solidification speeds can be improved by increasing pressure. A first theory why this occurs is that the increased pressure increases the density of the liquid, which increases the rate of molecular interaction with the solid matrix. The second is that the increased pressure elevates the solidification temperature, allowing hotter molecules to solidify, i.e., molecules moving at higher velocities to join the matrix. Under any theory, the elevated melting or solidification point implies that the solid condition is stable at higher temperatures, hence the rate of loss of solid molecules to liquid is suppressed while the rate of liquid molecules joining the crystal is increased. In this manner, a much faster retraction and re-crystallization of the polymer in the primary actuator can be achieved. The secondary actuator may be smaller and less powerful than the primary actuator.

In the embodiments using mats of woven high thermal conductivity fiber, e.g., FIG. 3C, the mats are preferably woven of tows containing 2,000 filaments, each 10 microns or so in diameter. A given core preferably contains about 10 tows in parallel across a voltage difference. When making an electrical connection, the resistance between an electrode and the fibers contacting it can be relatively large compared to the resistance drop across the mat. If a high contact resistance exists in the area of connection, a parasitic heating zone is created which can create troublesome heat reservoirs and slow cooling. It can also create peak temperatures which are hot enough to be damaging to the mat, the interconnection, and the polymer. To avoid these hot spots, ceramic fibers are metallized and soldered or brazed to the electrodes to minimize contact resistance.

With reference to FIG. 5, a piston 60 again has a tapered, conical surface 62. A body or housing 64 includes a larger diameter cylindrical bore portion 66 for receiving a larger diameter portion of piston 60 and a smaller diameter bore portion 68 for slidably receiving a smaller diameter bore portion of piston. The housing defines a closed chamber which receives an actuator assembly 70 of the construction described above. That is, the actuator assembly again includes a heat expansible polymer and a heat source such as nichrome wires. Woven insulation and additional thermal conductors as described above may also be utilized.

When current is applied to the actuator expanding the polymer, the piston moves deeper into the body such that an annular surface 72 presses against a working fluid 74. The working fluid 74 is preferably a stiff, relatively incompressible fluid, such as hydraulic fluid. Because the piston develops forces on the order of 10,000 psi or better, the working fluid can be a relatively stiff polymer, including polymers which are thought of as solids at standard atmospheric pressure. Under the pressure, the working fluid flows into a bore 76 of the piston and acts on a smaller diameter surface 78 of a main piston 80. The transmission ratio of the surface areas of surfaces 72 and 78 determines a hydraulic multiplier in movement between the large diameter piston 60 and the main piston 80. Conversely, the inverse of this ratio determines the reduction in force. In this manner, the large diameter piston 60 moves with a small travel, but with a very high force. The mechanical advantage conversion means converts the higher force, lower travel to a lower force, higher travel of main piston 80.

Two advantages of the conical actuator are that it provides a large cooling surface to the polymer and minimizes the flow path of the polymer, minimizing viscous flow losses. Ideally, the polymer viscous flow path is limited to the thickness of the actuator assembly 70 and less.

Figure 6:
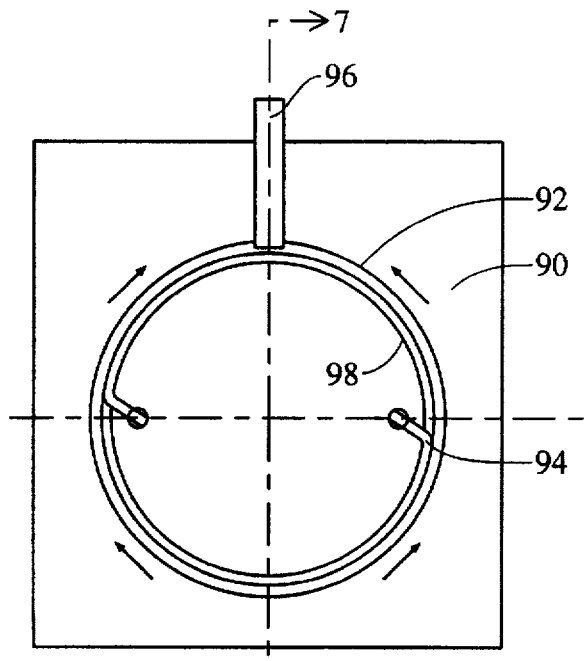
FIG. 6 is a cross-sectional view of another alternate cylindrical core embodiment of the actuator of the present invention.
Figure 7:
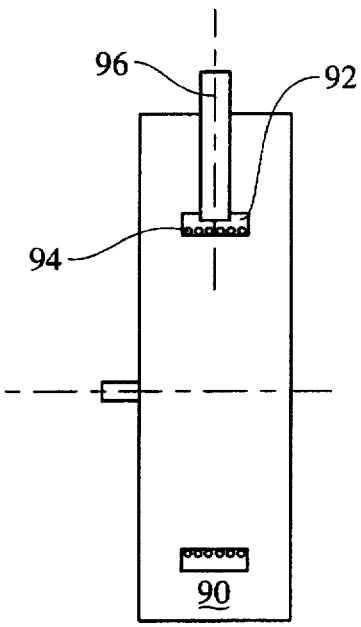
FIG. 7 is a cross-sectional view through section 7—7 of FIG. 6.

With reference to FIGS. 6 and 7, a body 90 defines an annular sealed chamber 92 therein. Heating wires or elements 94 are wrapped tightly around and insulated from a central cylindrical core 98 of the body which defines an inner diameter of the sealed chamber 92. Again, the wires may be covered with an electrical insulator which allows the expandable polymer to flow therethrough. A pin 96 is slidably received in a corresponding bore in the housing 90. As the heat causes the polymer to expand, the pin 96 is extended relative to the housing 90. Again, in the spiral wrapped resistance heating wires, the polymer melts first along the surface of the heating wires. Thus, the heating wires provide an annular path of liquid polymer around the housing to the piston 96 for a rapid response.

A cylindrical melting zone around adjacent wires grows to sufficient size to link up and eliminate viscous flow problems due to solid material between the wires. Similarly, upon cooling, an early freezing can occur in the link up areas and restrict return of the polymer. In the FIG. 6 embodiment, the wires are oriented in the direction of the flow path to create a multi-flow path upon first melting. This is effective in eliminating the initial resistance to expansion represented by the solid polymer walls between the wires in FIG. 3A. Because the wires reach the highest temperatures of any component within the unit and cool last, the fluid polymer flow path along the wires remains open upon deactuation and allows for more uniform return of the polymer.

Figure 8:
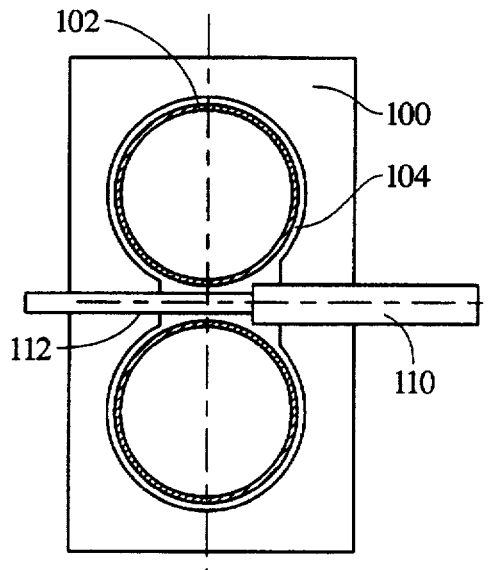
FIG. 8 is a sectional view of a toroidal core alternate embodiment of the present invention.
Figure 9:
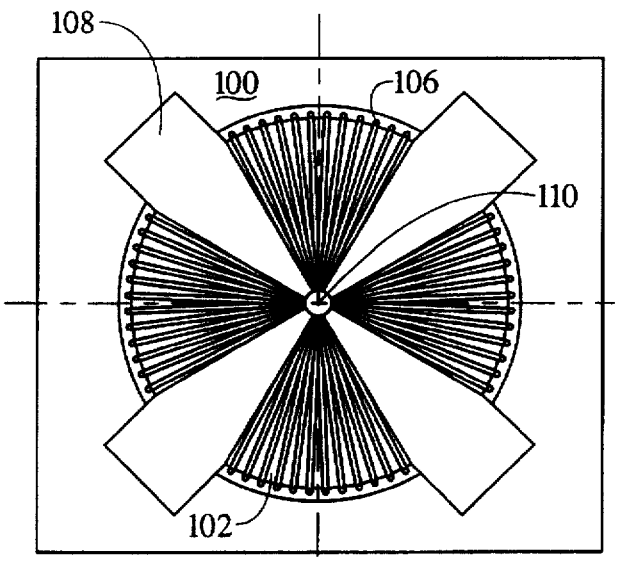
FIG. 9 is a sectional view through section 9—9 of FIG. 8.

With reference to FIGS. 8 and 9, multiple cylindrical chambers analogous to the chamber in the embodiment of FIGS. 6 and 7 can be interconnected with a single piston. In the embodiment of FIGS. 8 and 9, the sealed cylindrical chamber is extended into a toroid. That is, a body portion 100 has a generally toroidal or annular opening in which a toroidal core 102 is suspended. The toroidal core in the illustrated embodiment is of high thermal conductivity and is thermally grounded to the body 100 by thermal ground lugs 108. Optionally, a cooling fluid may be circulated through the core 102, particularly during deactuation to accelerate deactuation. As another alternative, the fluid in the core may be held at a maintained temperature such that very little heat is needed for actuation and to remove heat quickly during deactuation.

The toroidal core is surrounded by a generally toroidal sealed chamber 104. Heating wires or elements 106 are wrapped around the toroidal former 102 and disposed in the sealed chamber 104. The metal lugs 108 provide a thermal path from the toroidal core 102 to the body 100. This enables a thermal load applied to the core 102 to be transferred to the body 100 such that a heat sink path is provided for the core. A pin or differential piston 110 is slidably received in the body 10. In the illustrated embodiment, the piston 110 includes a smaller diameter shank portion 112 which passes through the sealed chamber and is also received slidably in the body portion to provide a small piston area between the two diameters of the piston 110. This allows a larger shaft diameter for strength concerns while minimizing the piston area to allow for higher linear travel of the piston. Moreover, multiple toroids can be ganged in multiple stages to increase the force capacity by coupling the output shaft to the input shaft of another actuator of similar design.

Figure 5:
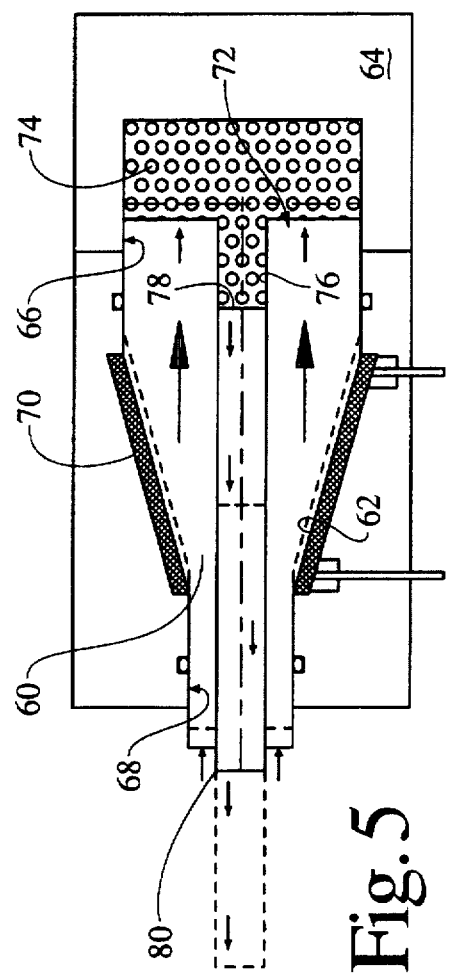
FIG. 5 is a conical piston actuator analogous to FIG. 1 with an integral hydraulic multiplier.

The embodiment of FIG. 10, like the embodiment of FIG. 5, includes a motion multiplier. Again, designs without motion multipliers tend to have a relatively short stroke with a large force. In many applications, a medium force and medium travel is preferred. To this end, a housing 120 defines a chamber or well which holds a conduction matrix core 122. A diaphragm 124 seals the core and the well. Above the diaphragm, a chamber is filled with a working fluid or rubber molding 126. A piston 128 of smaller diameter than the working area of the diaphragm is slidably received in a top housing portion in communication with the rubber or working fluid. The working fluid is pressurized by the diaphragm extending in the piston, creating a hydraulic motion multiplier. The FIG. 10 embodiment is suitable for many actuators, but introduces a relatively large amount of potentially compressible rubber material into the chain of force. Preferably, less compressible materials than rubber are utilized between the diaphragm and the piston as the working fluid.

Figure 11:
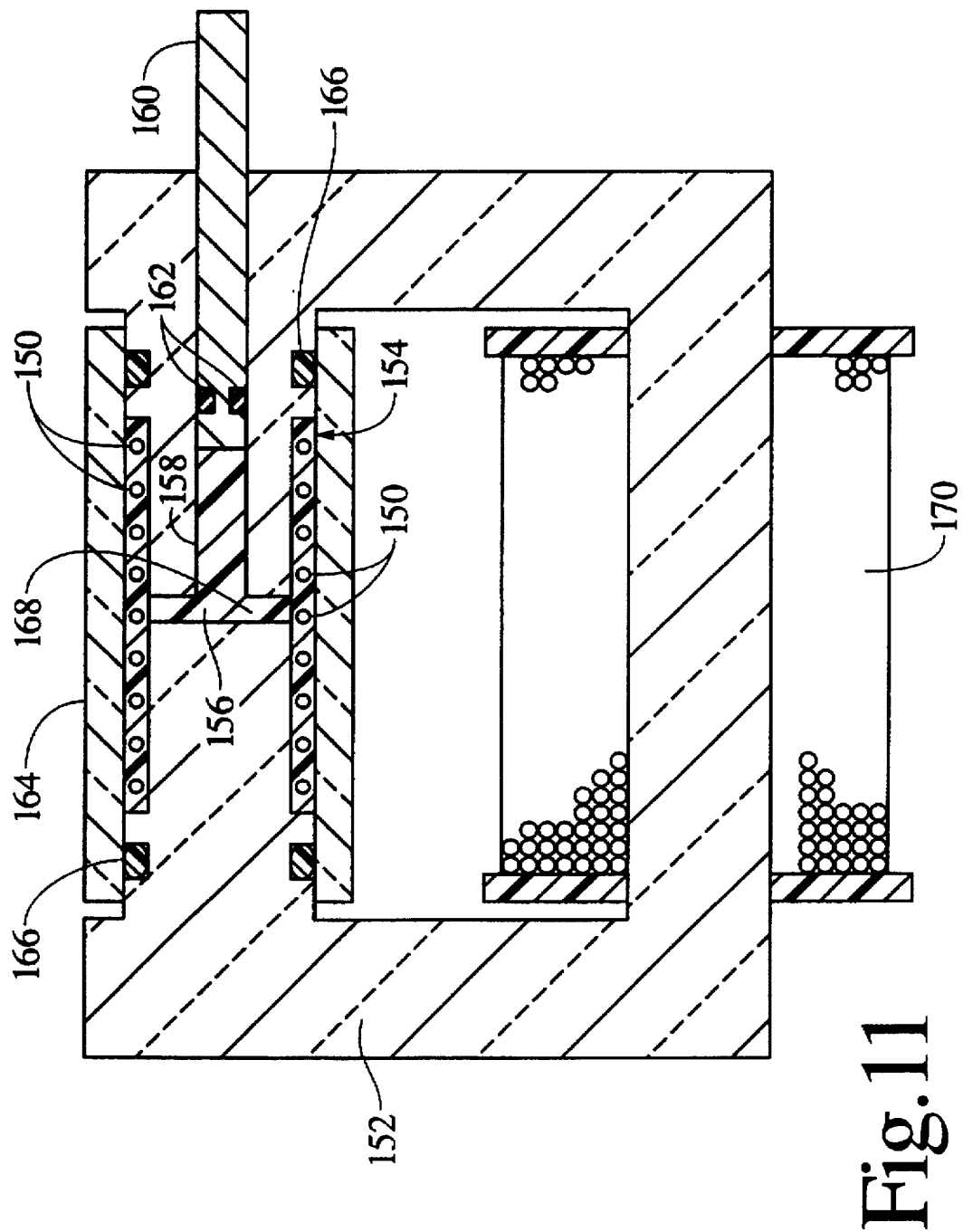

In the embodiment of FIG. 11, the actuator is inductively controlled. Electrically conductive carbon fibers 150 are wound tightly around a ceramic or iron magnetic flux conductive core 152 in a recessed region 154. The recessed region is connected by radial bores 156 to a central bore 158. A piston 160 with sealing O-rings 162 is slidably received in the central bore. A thermally conductive outer wall 164 closes the recess to define a closed annular chamber. The outer wall is preferably constructed of beryllium oxide ceramic to avoid parasitic induction of the magnetic field by the outer housing. O-rings 166 seal the annular chamber. The annular chamber including all voids among the tightly wound carbon filaments and the radial and central bores are filled with a polymeric expansion medium 168, such as wax. As the expansion medium in the annular chamber changes state and expands, the polymeric material in the radial and central bores is put under sufficient pressure that it flows, even without changing state. As the polymeric material flows, it forces the piston to extend. Alternately, bores 156, 158 can be filled with an elastomeric compound capable of transferring the expansion to the piston. In this embodiment, the expansion polymer is restricted to area 150.

The iron or ceramic magnetic core extends in a loop. A wire winding 170 is wrapped around a remote portion of the core loop for selectively generating magnetic flux through the loop. The magnetic flux induces currents in the electrical carbon fiber winding 150 causing resistance heating of the polymeric expansion material in the annular chamber. Optionally, resistance heating wires may be wound with the carbon fibers. The heating causes the polymeric material in the annular region to change state and expand, extending the piston. The dense winding of carbon fiber windings which all receive the same magnetic flux assure even heating. The primary winding 170 has the electrical characteristics of a solenoid, permitting existing solenoid control circuitry to be used. The rapid transfer of power into the secondary carbon fiber winding 150 provides rapid actuation speeds, comparable with a solenoid. Further, the high pressure electrical feedthroughs of the other embodiments are eliminated.

From the foregoing, it can be seen that a coordinate set of properties are important for high performance thermochemical actuators. It is the synergistic application of these design features which achieve high performance in terms of speed, efficiency, and travel. The design features include thin core sections (short path length), low diffusivity to facilitate rapid cooling (short path length), rapid response to actuation currents (low thermal mass), and a construction which allows pressure flow from the polymer expansion site to a mechanical expansion site, e.g., a piston or diaphragm with low viscous flow losses.

The condition of low viscous flow paths allows a larger mass of volume generating polymer to apply itself to the mechanical expansion site. This allows faster and longer piston travels. Long thin core sections are good for rapid cooling (short heat sink path length) but tend to create larger viscous losses (long thin flow paths). Short, fat core sections reduce viscous losses (and the viscous flow path length) but inhibit cooling (by increasing the heat sink path length). Additionally, the higher the state of melt of the polymer, the lower the viscosity which reduces viscous flow losses. The use of a central resistance heater, whether wire or ceramic fiber, allows a low viscous melt stage polymer to exist along the heater surface and provide a liquid, low viscosity flow area. Further, the orientation of the central resistance heater such that the low viscosity flow area develops in a continuous path from the remote pressure generating element to the mechanical expansion zone is beneficial in minimizing viscous losses. In addition to the geometric approaches illustrated above, numerous other geometries will also achieve this same principle.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A thermochemical actuator comprising:
   a body portion having a piston receiving bore;
   a piston slidably received in the piston receiving bore and having a surface for selectively receiving motive force for moving the piston;
   the body portion defining a shallow recess opposite the force receiving surface of the piston, the shallow recess having a back wall which is generally parallel to the piston force receiving surface, the housing and piston interacting such that the recess defines a sealed chamber;

a polymeric material which expands on heating and a resistance heating element disposed in and wound through the sealed chamber such that selective actuation of the heating element causes polymer immediately adjacent the heating element to liquify defining molten tunnels along which pressure generated as the polymer expands is rapidly conveyed to the piston, exerting pressure on the piston pressure receiving surface causing the piston to move and such that upon cooling of the polymer, the polymer retracts along the tunnels allowing the piston to retract.

2. The actuator as set forth in claim 1 wherein the piston force receiving surface is conical.

3. The actuator as set forth in claim 1 wherein the piston is a differential piston with a large cross-section portion and a small cross-section portion disposed in communication with the polymeric material.

4. The actuator as set forth in claim 3 wherein the piston has a first end extending from the body portion through a first seal and a second end extending from the body portion through a second seal.

5. The actuator as set forth in claim 1 wherein the piston is connected with a force reducing and travel increasing transmission.

6. The actuator as set forth in claim 5 wherein the transmission includes a hydraulic multiplier.

7. The actuator as set forth in claim 5 wherein the transmission includes:

a chamber defined between the piston and the housing which holds a working fluid;

a second piston slidably received in the first piston and having one end in pressure communication with working fluid, the second piston having a small cross-sectional area in pressure communication with the working fluid than the first piston.

8. The actuator as set forth in claim 1 wherein the piston further includes a second force receiving surface and wherein the housing defines a second recess having an inner surface substantially parallel to the piston second force receiving surface such that a second sealed chamber is defined therebetween, the second sealed chamber containing a heat expanding polymer though which a second resistance heater is wound.

9. The actuator as set forth in claim 8 wherein the two force receiving surfaces are disposed such that the received forces from expanding polymer in the first and second recesses exert forces with opposing components such that expanding polymer in the second recess tends to compress the polymer in the first recess.

10. The actuator as set forth in claim 1 wherein the piston surface and the body portion back wall are constructed of a thermally conductive material for conveying thermal energy from the polymer.

11. A thermochemical actuator comprising:

a body portion having a piston receiving bore;

a piston slidably received in the piston receiving bore and having a surface for selectively receiving motive force for moving the piston;

the body portion defining a shallow recess opposite the force receiving surface of the piston, the shallow recess having a back wall which is generally parallel to the piston force receiving surface, the housing and piston interacting such that the recess defines a sealed chamber, the sealed chamber being generally annular;

a polymeric material which expands on heating and a resistance heating element wound around the sealed chamber and such that selective actuation of the resistance heating element causes the polymer to expand, exerting pressure on the piston pressure receiving surface causing the piston to move and such that upon cooling of the polymer, the polymer retracts allowing the piston to retract.

12. The actuator as set forth in claim 11 wherein the resistance heating element includes a resistance wire covered with an electrically insulating covering which is porous to the polymer material.

13. The actuator as set forth in claim 12 wherein the covering is constructed of a woven, electrically insulating fiber.

14. The actuator as set forth in claim 11 wherein the back wall of the body portion recess is less than 0.1 cm from the resistance wire windings.

15. The actuator as set forth in claim 14 wherein the heating elements are arranged perpendicular to a polymer flow path and are spaced less than 0.3 cm such that a molten polymer flow path develops from distant heating regions to the piston.

16. A thermochemical actuator comprising:

a body portion having a piston receiving bore;

a piston slidably received in the piston receiving bore and having a surface for selectively receiving motive force for moving the piston;

the body including an enlarged opening, a rigid insert inserted into the enlarged body opening such that a relatively thin recess is defined therebetween around the insert;

a polymeric material which expands on heating and a resistance heating element disposed in the thin recess, the resistance heating element being distributed through the polymer and the thin recess, such that selective actuation of the heater causes the polymer to expand, exerting pressure on the piston pressure receiving surface causing the piston to move and such that upon cooling of the polymer, the polymer retracts allowing the piston to retract.

17. The actuator as set forth in claim 16 wherein the insert is cylindrical.

18. The actuator as set forth in claim 16 wherein the enlarged opening and the insert are toroidal.

19. A thermochemical actuator comprising:

a body portion having an enlarged opening therein;

an insert disposed within the body portion enlarged opening such that a thin chamber is define between the insert and the body portion;

a heat expandable polymer filling the thin chamber;

a heater disposed in the thin chamber and distributed through the polymer for heating the polymer to cause the polymer to expand, the heater being spaced within 0.1 cm from adjacent walls of the body portion and the insert;

a member in communication with the thin chamber such that expansion of the polymer urges the member to extend, the heater extending from remote regions of the heat expandable polymer to a region adjacent the member to develop a molten polymer flow path between the remote polymer regions and the region adjacent the member.

20. The actuator as set forth in claim 19 wherein at least a portion of the body portion and the insert that define the thin region are constructed of a thermally conductive material for conveying thermal energy from the expandable polymer.

21. The actuator as set forth claim 19 wherein the heater includes a resistance wire wrapped around the insert.

22. The actuator as set forth in claim 21 further including a covering of polymer porous electrically insulating material surrounding the resistance wire to insulate the resistance wire from the housing, adjoining windings of the resistance wire, and the insert.

23. The actuator as set forth in claim 21 wherein the insert is one of a toroid, a cylinder, and a cone.

24. The actuator as set forth in claim 19 further including at least one metal O-ring for blocking polymer flow between at least one of:

the piston and the housing;

between two portions of the housing; and, between the housing and the insert.

25. The actuator as set forth in claim 19 wherein the heater includes a matrix of high thermal conductivity fibers.

26. The actuator as set forth in claim 25 wherein the heater further includes an electrical resistance wire and an electrical insulation means for electrically insulating the resistance wire from the high thermal conductivity fibers.

27. The actuator as set forth in claim 25 wherein the heater further includes electrical interconnections connected with the fibers for passing electrical current therethrough such that at least a portion of the fibers function as electrical resistance heaters.

28. The actuator as set forth in claim 19 further including a means for reducing force exerted by the member and increasing travel of the member.

29. The actuator as set forth in claim 19 wherein the member includes one of a diaphragm, a piston, and a differential piston.

30. A thermochemical actuator comprising:

a body portion having an enlarged opening therein;

an insert disposed within the body portion enlarged opening such that a thin chamber is defined between the insert and the body portion;

a heat expandable polymer filling the thin chamber;

resistance wire disposed in the thin chamber and wrapped around the insert member for heating the polymer to cause the polymer to expand, the resistance wire being spaced within 0.1 cm from adjacent walls of the body portion and the insert;

a member in communication with the thin chamber such that expansion of the polymer urges the member to extend, the resistance wire extending from remote regions of the heat expandable polymer to a region adjacent the member to develop a molten polymer flow path between the remote polymer regions and the region adjacent the member.

31. The actuator as set forth in claim 30 further including a hydraulic converter for converting a high force, lower expansion distance of the member to a lower force, higher travel distance of a mechanical element.

32. A method of thermochemical actuation comprising:

applying an electrical current to a heater having a multiplicity of closely spaced thin elongated heating elements disposed in a polymer, the elongated heating elements being surrounded by an electrically insulating covering having pores or apertures therein;

as the electrical current is applied to the heater, polymer closely adjacent the elongated elements liquifies and expands;

pressure from the expansion of the polymer forces the liquified polymer to flow along the elongated heating elements with minimal viscous flow losses;

as the liquified polymer flows along the elongated heating elements under pressure, a portion of the liquified polymer flowing through the apertures in the electrically insulating covering creating jets of hot liquid or gaseous polymer which are injected into surrounding polymer to promote heating liquification thereof;

pressure from the liquid polymer pressing against unmelted polymer urging the unmelted polymer against a member causing the member to extend.

33. A method of thermochemical actuation comprising:

applying a first electrical current to a resistance heater in a first region having a multiplicity of closely spaced thin elongated heating elements disposed in a polymer;

as the electrical current is applied to the resistance heater, polymer closely adjacent the elongated elements liquifies and expands;

pressure from the expansion of the polymer forces the liquified polymer to flow along the elongated heating elements with minimal viscous flow losses;

pressure from the liquid polymer pressing against unmelted polymer urging the unmelted polymer against a piston causing the member to extend;

after heating the polymer in the first region to extend the member, applying an electric current to a second resistance heater to heat a heat expandable polymer in a second region as the polymer in the first region is permitted to cool, pressure from the polymer in the second region acting on the piston in an opposite direction to pressure from the polymer in the first region such that heating the polymer in the second region places a compressive force on the polymer in the first region accelerating retraction of the piston.

34. A method of thermochemical actuation comprising:

with elongated heating elements, conveying heat to a polymer in remote regions from a member causing melting and generating expansion of the polymer;

as the elongated heating elements heat the polymer, polymer closely adjacent the elongated heating elements liquifies and expands providing a melted polymer path to allow pressure flow from said remote polymer regions to a region adjacent the member with a minimum of viscous losses along the path;

pressure from the liquid polymer pressing against unmelted polymer urging the unmelted polymer against the member causing the member to extend.

35. The method as set forth in claim 34 wherein the elongated heating elements extend along one of a conical, a cylindrical, and a toroidal path.

36. The method as set forth in claim 34 wherein:

the member has a first, relatively large cross-sectional area surface which acts on a working fluid, such that extension of the member compresses the working fluid; and the working fluid pressing against a surface of a second member having a relatively small cross-sectional area such that the second member extends with a longer travel at a lower force than the first member.

37. The method as set forth in claim 34 wherein the elongated heating elements are disposed generally perpendicular to the melted polymer path and are spaced less than 0.3 cm apart such that the melted polymer flows transversely to the elongated heating elements from the remote region to the region adjacent the member.

38. The method as set forth in claim 34 wherein the elongated heating elements are disposed parallel to the melted polymer flow path such that the melted polymer flows therealong between the remote regions and the region adjacent the member.

39. The method as set forth in claim 34 further including removing heat energy through a body in which the polymer is disposed to cool the polymer and retract the member.

40. A thermochemical actuator comprising:
- an actuator body which defines an interior chamber, the chamber having a mechanical actuator zone disposed adjacent an expansion member and a remote region disposed away from the mechanical actuator zone;
- a thermally expansive polymer disposed in the chamber and extending from the remote zone to the mechanical actuator zone;
- a heating means for heating the polymer, the heating means being disposed within the chamber in close physical proximity to walls of the body portion such that there is a short thermal path length;
- a means to permit a flow of the polymer which is melted by the heating means to flow between the remote region and the mechanical actuator region with low viscous flow losses.

41. The thermochemical actuator as set forth in claim 40 wherein the heating means includes a plurality of elongated fiber-like resistance heating elements, the resistance heating elements extending from the remote zone to the mechanical actuation zone such that their heated surfaces provide the means for permitting the flow of polymer between the remote zone and the mechanical actuation zone.

42. The thermochemical actuator as set forth in claim 41 wherein the fiber-like resistance heating elements are disposed within 0.1 cm of the walls of the body to provide the short thermal path length and within 0.3 cm of each other to provide a short thermal path length therebetween.

* * * * *